Patented Dec. 31, 1935

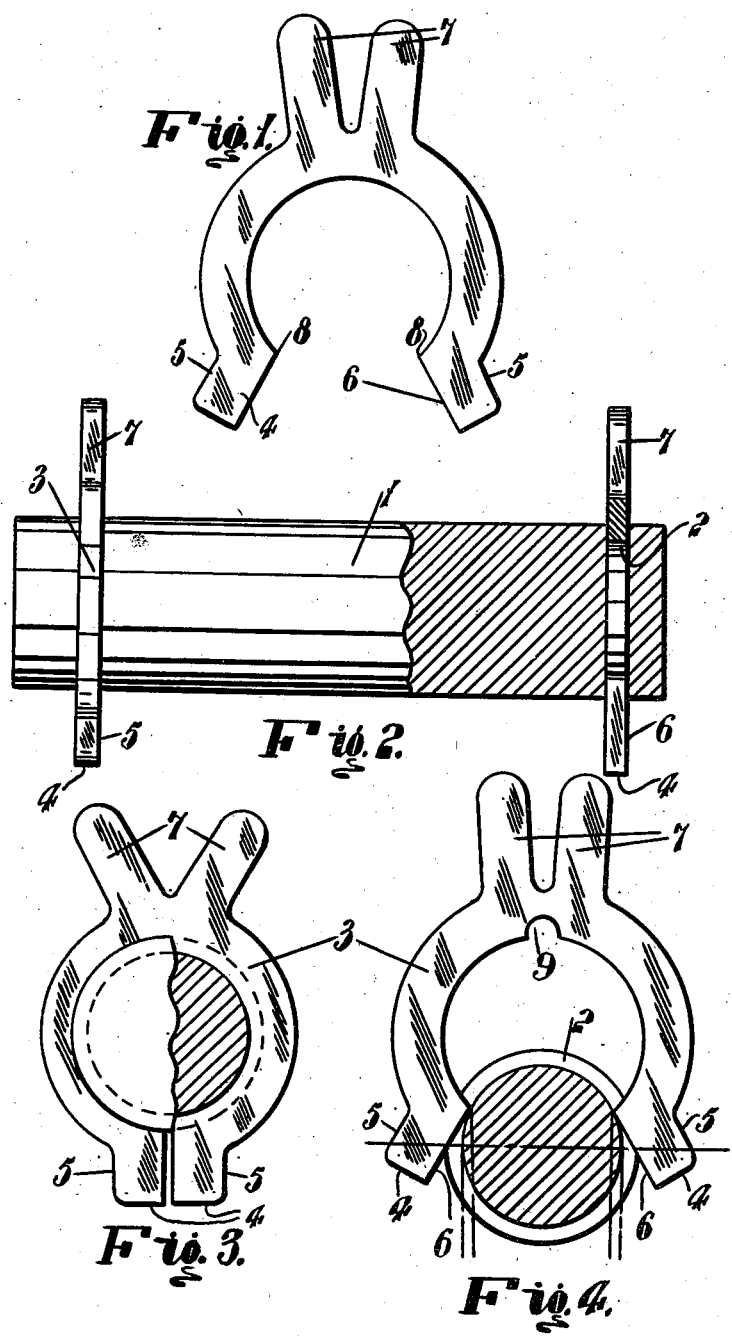

2,025,848

UNITED STATES PATENT OFFICE 2,025,848

LOCKING DEVICE FOR PINS, BOLTS, OR THE LIKE

Reginald Collis, Ottawa, Ontario, Canada

Application June 29, 1935, Serial No. 29,178
In Great Britain May 31, 1935

4 Claims. (Cl. 85—8)

The present invention relates to an improved locking device for pins, bolts or the like usually employed as part of coupling devices. The invention is particularly useful in connection with aircraft assembly in which a large number of pins are employed for connecting ailerons, elevator and rudder controls to appropriate operating members and also for use in connecting wing root fittings, fuselage bracing and multitudinous other purposes. The usual practice in aircraft assembly is to employ cylindrical pins with heads at one end and to pass split pins through the other end or to thread castellated nuts on the pins. For example, quite a large number of turnbuckles, control cables and bracing connections incorporate forks through the limbs of which are passed the said pins and the pins are held against removal by split pins or castellated nuts. It frequently happens that the split pins become sheared or loose and accidents result because of this failure. This tendency is diminished by the use of castellated nuts but this involves additional weight and cost which is objectionable.

The object of my invention is to eliminate the foregoing disadvantages and to provide a locking ring or collar which can be readily opened for removal from a bolt, pin or the like. A further object of the present invention is to provide a still further safety factor in connection with aircraft by so constructing the locking device that it can only be used once, a new one having to be fitted consequent upon removing one already used. A further object of the present invention is to provide a lighter and cheaper form of the locking device, and a still further object of this invention is to obviate the necessity of a special form of tool for fitting and removing the locking device. For example a locking device according to the present invention can be fitted and removed with the aid of an ordinary pair of pliers.

I am aware that heretofore it has been proposed to provide a split annular washer adapted to fit into a circumferential groove of a gudgeon pin to hold it against axial movement.

According to my present invention a locking device for pins or bolts comprises a ring or collar of substantially U or part annular form and adapted to have its inner edge engaged about the pin, bolt or the like and to have its ends brought close together, the ring or collar having a pair of projections located approximately midway between the said ends and adapted to be pinched towards each other to move said ends apart for removing the ring from the pin, bolt or the like.

One form of carrying my present invention into practice consists in forming a circumferential recess in the pin to be locked and engaging in said recess a substantially annular washer or locking member comprising the said ring or collar, the said substantially annular locking member being split and expanded substantially U fashion for engaging it over the pin, its extremities formed with luglike substantially radial extensions which are pinched together so that the inner periphery of the annular member is engaged in the circumferential recess in the pin. The ring or collar can be opened for removal from the bolt or pin by pinching together two substantially radial fingers extending from the outer edge of the ring or collar approximately midway between the ends of the ring or collar.

In carrying the invention into practice the said circumferential recess is preferably provided by forming a neck the desired distance from one or both ends of the pin, the depth of the neck being determined according to the diameter of the pin. The annular locking member can be composed of any suitable malleable metal or alloy shaped to the U configuration to enable it to be clipped, in a plane at right angles to the axis of the pin, into the said neck so that when its ends are brought together it produces the effect of a flange on the pin.

It is preferred that the annular locking member shall be composed of a metal or alloy which will fairly readily yield to the ends of the locking member being pinched towards each other, but yet will fracture if the member is subsequently opened.

In order that my invention may be clearly understood and readily carried into effect I have appended hereto a sheet of drawing illustrating embodiments thereof and wherein:—

Fig. 1 is a front elevation view showing the locking ring before use.

Fig. 2 is a part sectional side elevation view showing a pair of locking rings affixed to the ends of a pin.

Fig. 3 is a front elevation of Fig. 2 showing the pin partly in section taken in the plane of the locking ring.

Fig. 4 is a sectional end elevation view showing the relative dimensions of the locking member and pin.

Referring to the drawing the pin 1 shown is not formed with an integral flanged head although one end can be formed with such a head. The pin is formed with a circumferential channel 2 near each end, or in the case of a flange headed pin, near the other end thereof. The purpose of each channel 2 is to receive as an easy or smooth fit, a locking member 3 which is a metal or alloy plate preferably of substantially annular form. It is composed of a metal or alloy of low resiliency but malleable so that it can be bent and retain the shape to which it is manipulated, but will fracture under repeated bending.

The locking member 3 is in effect a split flat collar or ring and is produced in the splayed or open condition shown in Fig. 1. Its extremities are in the form of finger pieces or lugs 4 preferably lying in the same plane as the collar or ring 3 and extending substantially radially from the collar or ring to afford ample outer edges 5 for the engagement therewith of pliers or other suitable tool to pinch the inner edges 6 into engagement with each other or very close to each other as shown in Fig. 3 whereby the annular collar or ring is firmly gripped in the appropriate channel 2 and extends substantially completely around the pin to provide a flange like abutment on the pin which can only be removed by forcing the lugs 5 apart.

The separation of the lugs 5 can be effected by gripping them with suitable tools and pulling them apart, but if desired they may be moved apart by pinching together a pair of finger pieces 7 integral with the ring or collar 3 and diametrically opposed to the lugs 5. These finger pieces are arranged V fashion so that their free ends can be gripped between the jaws or pliers or other suitable tool and the lugs moved apart.

It is preferred that when the locking ring or collar is produced the distance between the corners 8 constituting the inner ends of the edges 6 shall be only slightly less than the inner diameter of the pin or bolt 1 as shown in Fig. 4 so that it can be readily clipped over the pin 1. This serves as a useful and ready means of ensuring that the proper locking ring is affixed to a pin or is of predetermined diameter, because only a very slight pressure on the locking ring is required to press the corners 8 over the pin. A too small collar or ring could not be so readily pressed over the pin or bolt, and with a too large collar or ring the corners 8 would not oppose fitting the collar or ring. By this means time is saved and a reliable safety guide is provided to indicate whether or not the proper collar or ring is being fitted.

If desired the width of the collar or ring 3 midway between its ends may be reduced, e. g. as shown in Fig. 4 by forming a recess 9 to weaken the ring or collar at this point to the extent required to ensure that the member 3 will fracture if the lugs 5 are forced apart when removing the member 3 from the pin. However, the apex of the V formed by the inner edges of the ring 3 may be carried into the ring 3 in Fig. 1 a sufficient distance to effect this result.

An advantage of this tendency to fracture when the ring 3 is opened for removal from the pin is that a new ring will have to replace the removed ring.

It will be seen that if flange headed or cheese headed pins or bolts are avoided there will result a saving in weight of heavy metal, and considering the large number of pins and bolts employed on aeroplanes this is a desideratum. Also the pin is cheaper to produce. It will also be appreciated that the possibility of the locking ring being opened accidentally by one of the lugs 5 being knocked is avoided by reason of the ring yielding to the knock and rotating around the pin.

The lugs 5 may be bent between their ends to produce upstanding free ends and/or apertures may be provided in such lugs to receive suitable tools to pull the lugs apart, when it is required to dispense with the finger pieces 7. The locking ring may be applied to bolts with threaded ends by cutting a circumferential groove in the bolt against the nut and then fitting the ring 3 into a groove to act as a lock for the nut.

It will be understood that although I have described and shown a substantially annular ring, its outer periphery may be polygonal, e. g. hexagonal or other desired configuration, and that such obvious deviations in configuration are contemplated by the expression "substantially annular".

What I claim is:—

1. A locking device of metal or metal alloy for use with pins, bolts or the like, comprising a ring of substantially U form adapted to have its ends brought close together and a pair of lug like projections integral with said ring located close to each other approximately midway between the said ends and adapted to be pinched towards each other to move said ends apart for removing the ring from the pin, bolt or the like.

2. A locking device of metal or metal alloy for use with pins, bolts or the like, comprising a thin metal substantially annular plate, split in a substantially radial direction and opened substantially U fashion, a pair of outwardly directed luglike extensions adjacent the ends of said plate and opposite sides of the split, and a further pair of luglike extensions approximately midway between the ends of the plate adapted to be pressed or pinched towards each other to open out the plate for removing it from the pin, bolt or the like.

3. A locking device of metal or metal alloy for use with pins, bolts or the like, comprising a ring of substantially U form adapted to have its ends brought close together, a pair of substantially radially directed lugs at the ends of said ring adapted to have their opposed edges abutted against each other when said ends are brought together and a pair of luglike projections arranged substantially V fashion integral with said ring located close to each other approximately midway between the said ends and adapted to be pinched towards each other to move said ends apart for removing the ring from the pin, bolt or the like.

4. A locking device of metal or metal alloy for use with pins, bolts or the like, comprising a ring of substantially U form adapted to have its ends brought close together and a pair of luglike projections arranged substantially V fashion integral with said ring located close to each other approximately midway between the said ends and adapted to be pinched towards each other to move said ends apart for removing the ring from the pin, bolt or the like, and a depression formed in the inner edge of said ring opposite the junction of said projections.

REGINALD COLLIS.